United States Patent [19]
Fujiwara et al.

[11] Patent Number: 6,094,940
[45] Date of Patent: Aug. 1, 2000

[54] MANUFACTURING METHOD OF SYNTHETIC SILICA GLASS

[75] Inventors: Seishi Fujiwara; Norio Komine, both of Sagamihara; Hiroki Jinbo, Yokohama; Toshitsugu Suwa, Machida, all of Japan

[73] Assignee: Nikon Corporation, Tokyo, Japan

[21] Appl. No.: 09/265,891

[22] Filed: Mar. 11, 1999

Related U.S. Application Data

[63] Continuation-in-part of application No. 09/168,149, Oct. 8, 1998, abandoned.

[30] Foreign Application Priority Data

Oct. 9, 1997 [JP] Japan ................................ 9-277021
Mar. 11, 1998 [JP] Japan ............................... 10-059579

[51] Int. Cl.$^7$ .......................................... C03B 20/00
[52] U.S. Cl. ........................... 65/17.4; 65/17.2; 65/421; 261/128; 261/135
[58] Field of Search .................... 65/17.2, 17.4, 65/29.15, 29.16, 379, 415, 421; 261/127, 128, 135

[56] References Cited

U.S. PATENT DOCUMENTS

| | | | |
|---|---|---|---|
| 3,885,930 | 5/1975 | Scheerer | 55/196 |
| 4,225,330 | 9/1980 | Kakuzen et al. | 65/18 |
| 4,419,118 | 12/1983 | Reiji et al. | 65/18.2 |
| 4,421,540 | 12/1983 | Nakahara et al. | 65/3.12 |
| 4,445,918 | 5/1984 | Modone et al. | 65/3.12 |
| 4,529,427 | 7/1985 | French | 65/3.12 |
| 4,855,254 | 8/1989 | Eshita et al. | 437/100 |
| 4,881,412 | 11/1989 | Northedge | 73/861.04 |
| 5,004,488 | 4/1991 | Mehrotra et al. | 65/18.2 |
| 5,043,002 | 8/1991 | Dobbins et al. | 65/3.12 |
| 5,290,602 | 3/1994 | Argyropoulos et al. | 427/421 |
| 5,356,451 | 10/1994 | Cain et al. | 65/414 |
| 5,632,797 | 5/1997 | Williams | 65/413 |
| 5,707,415 | 1/1998 | Cain | 65/379 |

FOREIGN PATENT DOCUMENTS

| | | |
|---|---|---|
| 0 058571 A1 | 8/1982 | European Pat. Off. . |
| 0635 460 A2 | 1/1995 | European Pat. Off. . |
| 04119928 | 4/1992 | Japan . |
| 2015991 | 9/1979 | United Kingdom . |
| WO 97/22553 | 6/1997 | WIPO . |

*Primary Examiner*—Sean Vincent
*Attorney, Agent, or Firm*—Morgan, Lewis & Bockius LLP

[57] ABSTRACT

A method of manufacturing synthetic silica glass includes the steps of pressurizing a liquid storage tank including a liquid silicon compound therein, generating bubbles in the liquid silicon compound using a foamer, removing the bubbles using a degasser, displacing the liquid silicon compound into a vaporizer while controlling an amount of the liquid silicon compound displaced by a liquid mass flow meter, mixing the displaced liquid silicon compound with a carrier gas to generate a gaseous silicon compound, injecting the gaseous silicon compound into a synthesis furnace, and forming synthetic silica glass by hydrolyzing the gaseous silicon compound in the synthesis furnace.

10 Claims, 3 Drawing Sheets ized optical material with high transmittance in the ultraviolet range is silica glass.

MANUFACTURING METHOD OF SYNTHETIC SILICA GLASS

This is a continuation-in-part of application Ser. No. 09/168,149 filed on Oct. 8, 1998, now abandoned.

This application claims the benefit of Japanese patent application No. Heisei 09-277021, filed Oct. 9, 1997 and Japanese Patent Application No. Heisei 10-059579, filed Mar. 11, 1998, which are hereby incorporated by reference.

BACKGROUND OF THE INVENTION

1. Field of the Invention

The present invention relates to a manufacturing method of synthetic silica glass.

2. Discussion of the Related Art

Currently, steppers are being used for photolithography to expose and transcribe very small integrated circuit patterns on, for example, semiconductor substrates during the manufacturing process of semiconductor devices. Recently, due to a higher integration of Large Scale Integrated Circuits (LSI), ultraviolet light, which has shorter wavelengths than visible light, has been used in the stepper's light source. Therefore, an optical system of an exposure apparatus must include components that transmit light in the ultraviolet range, since conventional optical glass is impractical to use in such applications. One known example of an optical material with a high transmittance in the ultraviolet range is silica glass.

In addition, the optical system of the exposure apparatus includes multiple optical members, such as lenses, which are used for adjusting for aberrations. Therefore, in order to have a high transmittance for the entire optical system of the exposure apparatus, each individual optical member must have a high transmittance. In order to increase the transmittance of silica glass, the silica glass must have a high purity. One known manufacturing method by which high purity silica glass can be obtained is a flame hydrolysis method (sometimes called a "direct method" or a "direct flame hydrolysis method").

For the flame hydrolysis method, a silicon compound with high purity, such as silicon tetrachloride ($SiCl_4$) is used. This compound, along with a combustion gas and a combustible gas (such as oxygen and hydrogen), which are used for heating and for the hydrolysis reaction, are expelled from a burner toward a target in a synthesis furnace. The target is rotated and lowered in the synthesis furnace. The starting material expelled from the burner is hydrolyzed by the oxygen/hydrogen flame and forms minute silica glass particles (soot). The soot is deposited, fused, becomes transparent, and forms an ingot of silica glass. The silica glass thus obtained is called synthetic silica glass.

The higher the chlorine concentration in the synthetic silica glass, the lower the durability to ultraviolet radiation of the synthetic silica glass. Therefore, in order to lower the chlorine concentration in the synthetic silica glass, it is preferable to use chloride-free silicon compounds.

When silicon chloride compounds are used, hydrogen chloride, which is a corrosive gas, is generated in the synthesis furnace. To avoid generating hydrogen chloride, it is preferable to use silicon compounds, which are not chlorides, as a starting material for synthetic silica glass.

An example of a technology for using chloride-free organic silicon compounds as a starting material for synthetic silica glass is disclosed in "Tokukaihei" (publication of unexamined patent application) Heisei 4-270130 (1992) (corresponding to U.S. Pat. No. 5,043,002).

Compared to the boiling point of $SiCl_4$, which is 58° C. to 59° C., the boiling point of many organic silicon compounds is 100° C. or more, due to their high molecular weight. However, heat resistance of even the heat-resistant versions of commercial mass flow meters used for gases, is, at most, only 80° C. Therefore, it has been difficult to control the amount of the gaseous organic silicon compound introduced into the synthesis furnace.

Therefore, there is a need for a manufacturing method for synthetic silica glass that can control the amount of a silicon compound having a high boiling point when introduced to the synthesis furnace.

SUMMARY OF THE INVENTION

Accordingly, the present invention is directed to a method of manufacturing of synthetic silica glass that substantially obviates one or more of the problems due to limitations and disadvantages of the related art.

An object of the present invention is to provide a better controlled method of manufacturing of synthetic silica glass.

Another object of the present invention is to provide a manufacturing method of synthetic silica glass where a material solution is supplied in a stable manner to the vaporizer.

Another object of the present invention is to improve the precision of flow control of the material solution using a liquid mass flow meter.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, in one aspect of the present invention there is provided a manufacturing method of synthetic silica glass including the steps of introducing a liquid silicon compound into a vaporization equipment, wherein an amount of the liquid is controlled with a liquid mass flow meter 20, converting the liquid into a gaseous silicon compound, and supplying the gaseous silicon compound into a synthesis furnace to form synthetic silica glass.

In another aspect of the present invention there is provided a method of manufacturing synthetic silica glass including the steps of pressurizing a liquid storage tank including a liquid silicon compound therein, displacing the liquid silicon compound into a vaporization equipment while controlling an amount of the liquid silicon compound displaced by a liquid mass flow meter 20, mixing the liquid silicon compound with a carrier gas to generate a gaseous silicon compound, injecting the gaseous silicon compound into a synthesis furnace, and forming synthetic silica glass by hydrolyzing the gaseous silicon compound in the synthesis furnace.

In another aspect of the present invention there is provided a manufacturing method for synthetic silica glass including the steps of generating bubbles in a liquid silicon compound using a foamer, removing the bubbles using a degasser, introducing the liquid silicon compound into a vaporizer, vaporizing the liquid silicon compound to produce a vapor; and introducing the vapor into a synthesis furnace to form synthetic silica glass, wherein a flow rate of the liquid silicon compound is controlled using a liquid mass flow meter.

In another aspect of the present invention there is provided a method of manufacturing synthetic silica glass including the steps of generating bubbles in a liquid silicon compound using a foamer, removing the bubbles using a degasser, introducing the liquid silicon compound into a vaporizer, wherein an amount of the liquid silicon compound is controlled with a liquid mass flow meter, converting the liquid silicon compound into a gaseous silicon compound, and supplying the gaseous silicon compound into a synthesis furnace to form synthetic silica glass.

In another aspect of the present invention there is provided a method of manufacturing synthetic silica glass including the steps of pressurizing a liquid storage tank including a liquid silicon compound therein, generating bubbles in the liquid silicon compound using a foamer, removing the bubbles using a degasser, displacing the liquid silicon compound into a vaporizer while controlling an amount of the liquid silicon compound displaced by a liquid mass flow meter, mixing the displaced liquid silicon compound with a carrier gas to generate a gaseous silicon compound, injecting the gaseous silicon compound into a synthesis furnace, and forming synthetic silica glass by hydrolyzing the gaseous silicon compound in the synthesis furnace.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawing, which is included to provide a further understanding of the invention and is incorporated in and constitutes a part of this specification, illustrates an embodiment of the invention and together with the description serves to explain the principles of the invention.

DETAILED DESCRIPTION OF THE PREFERRED EMBODIMENTS

Figure 1:
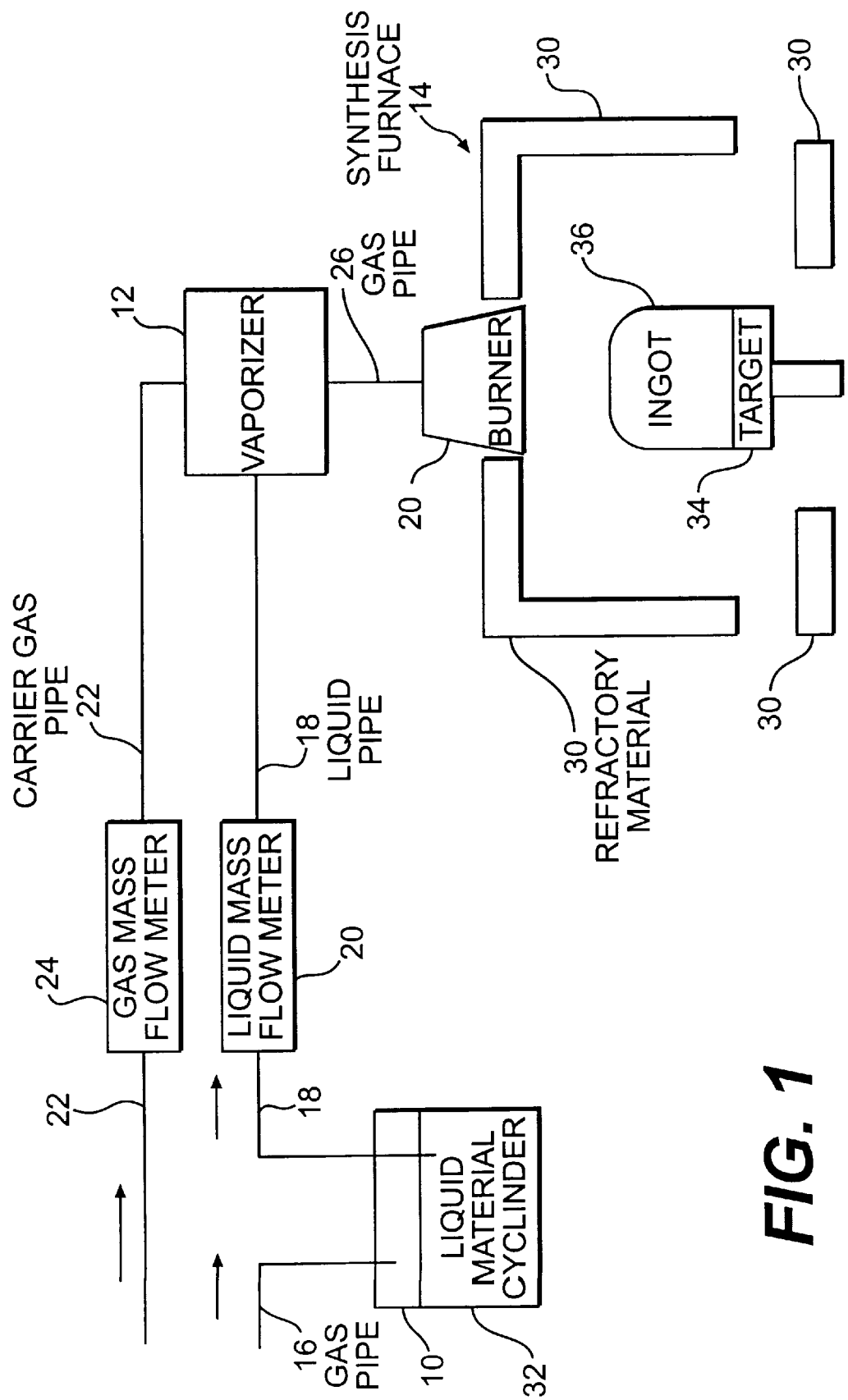
FIG. 1 is a block diagram that illustrates the structure of the synthetic silica glass manufacturing apparatus used in a preferred embodiment of the present invention.

Reference will now be made in detail to a preferred embodiment of the present invention, an example of which is illustrated in the accompanying drawing.

The inventors of the present invention have conducted various experiments, and as a result, have considered controlling the flow amount of a silicon compound having a high boiling point by controlling it at a temperature below its boiling point, while it is in a liquid state.

As described above, the temperature of the liquid silicon compound (such as for an organic silicon compound) should be lower than its boiling point. Therefore, the flow amount of the liquid silicon compound can be controlled by a liquid mass flow meter 20. Accordingly, by controlling the amount of liquid silicon compound introduced into the vaporization equipment, it is possible to indirectly control the amount of gaseous silicon compound introduced into the synthesis furnace.

In addition, when impurities (such as hydrocarbons) are mixed in the liquid silicon compound in the vaporization equipment, the impurities with a boiling point that is higher than the silicon compound are not vaporized. The non-vaporized impurities are left in the vaporization equipment. Therefore, it is possible to separate the impurities from the gaseous silicon compound (vapor) in the vaporization equipment.

According to the manufacturing method of synthetic silica glass of the present invention, it is preferable to generate the gaseous silicon compound by mixing the liquid silicon compound in a mist or aerosol state with a carrier gas and heating them in the vaporization equipment.

As described above, when the liquid silicon compound is mixed with a carrier gas after being placed in a mist state (minute particles), it is possible for the liquid silicon compound to effectively receive the kinetic energy of the carrier gas. Therefore, it is possible to uniformly diffuse the liquid silicon compound in the mist state in the vaporization equipment, and, as a result, it is possible to effectively vaporize the liquid silicon compound.

When the temperature of the gaseous silicon compound is near the boiling point of the silicon compound, there is the possibility that the gaseous silicon compound re-liquidizes before it is introduced into the synthesis furnace.

According to the manufacturing method of synthetic silica glass of the present invention, it is preferable that the gaseous silicon compound is heated in the vaporization equipment to a temperature that is 10° C. or more than a boiling point of the silicon compound. By setting the temperature of the gaseous silicon compound at 10° C. or higher than the boiling point of the silicon compound, it is possible to reduce the risk of re-liquidization of the gaseous silicon compound.

When the boiling point of the silicon compound is, for example, less than 50° C., it is difficult to handle because it is easily vaporized. On the other hand, when the boiling point of the silicon compound is, for example, greater than 140° C., there is a high risk that the temperature of the gaseous silicon compound will drop below the boiling point in the pipe that introduces the gaseous silicon compound into the synthesis furnace. As a result, a high risk exists that the gaseous silicon compound will re-liquidize.

Thus, it is preferable to use silicon compound with a boiling point in the range of 50° C. to 140° C., more preferably between 70° C. and 130° C.

It is also preferable to use alkoxysilane, alkylcyclosiloxane, or alkylsiloxane as the silicon compound.

The structure of the synthetic silica glass manufacturing apparatus used in the manufacturing method of the synthetic silica glass of the present invention will be described with reference to FIG. 1. FIG. 1 is a block diagram that illustrates the synthetic silica glass manufacturing apparatus used in the manufacturing method of synthetic silica glass of the preferred embodiment.

In FIG. 1, except for the gas supply structure (such as pipes), any structural illustrations, such as those for supplying a combustion gas (such as oxygen) and a combustible gas (such as hydrogen), are omitted.

The synthetic silica glass manufacturing apparatus includes a liquid material cylinder 10 (a liquid storage tank), a vaporization equipment (vaporizer) 12, and a synthesis furnace 14. A pressurizing gas pipe 16 is connected to liquid material cylinder 10. The liquid material cylinder 10 and the vaporization equipment 12 are connected by a liquid material pipe 18. In the middle of the liquid material pipe 18 is a liquid mass flow meter 20. For example, the LX-1200 meter manufactured by AERA JAPAN LTD. may be used as the liquid mass flow meter 20.

A carrier gas pipe 22 is connected to the vaporizer 12. In addition, a gas mass flow meter 24 is provided in the carrier gas pipe 22.

The vaporizer 12 and the synthesis furnace 14 are connected by a gas material pipe 26. The gas material pipe 26 is connected to a burner 28 of the synthesis furnace 14. The synthesis furnace 14 is surrounded with refractory material 30.

In the present invention, a pressurizing gas is sent through the pressurizing gas pipe into the liquid material cylinder 10 where a liquid silicon compound 32 is stored. The liquid silicon compound 32 is a liquid organic silicon compound. It is desirable to have the boiling point of the organic silicon compound in a range from 50° C. to 140° C., and preferably in a range from 70° C. to 130° C.

It is desirable to use a pressurizing gas that is difficult to dissolve in the liquid silicon compound 32. For example, helium may be used as the pressurizing gas. When the pressurizing gas is sent to the liquid material cylinder 10, the liquid silicon compound 32 is displaced from the liquid material cylinder 10. The displaced liquid silicon compound 32 is thus supplied to the vaporizer 12 through the liquid mass flow meter 20 and the liquid material pipe 18.

The amount of liquid silicon compound 32 introduced to the vaporizer 12 is controlled with the liquid mass flow meter 20. The liquid silicon compound 32 is approximately at room temperature, which is lower than its boiling point, so that it is possible to control it sufficiently using a conventional liquid mass flow meter 20.

Next, in the present invention, a gaseous silicon compound is generated by vaporizing the liquid silicon compound 32 in the vaporizer 12. The gaseous silicon compound is generated by mixing the liquid silicon compound 32 in a mist state with a carrier gas, and heating both. An inert gas (such as helium gas) is preferable for the carrier gas. Another option includes using nitrogen gas as the carrier gas. The pressurizing gas type need not be consistent with the carrier gas type. It is preferable for the carrier gas to be supplied at approximately 1.5 to 2.0 SLM (standard liters per minute). The amount of the carrier gas is controlled with the gas mass flow meter 24.

In the vaporizer 12, it is preferable to heat the gaseous silicon compound to a temperature greater than the boiling point of the organic silicon compound by 10° C. or more. It is preferable, for example, to use a rubber heater to do this. A high-frequency inductive coil can also be used for the heating.

Next, the gaseous silicon compound is introduced into the synthesis furnace 14. The gaseous silicon compound created in the vaporizer 12 is supplied to the burner 28 along with the carrier gas. The gaseous silicon compound supplied to the burner 28 is expelled from the burner 28 towards an ingot 36 of synthetic silica glass formed on a target 34 inside the synthesis furnace 14. Next, working examples 1 to 4, which are examples of manufacturing synthetic silica glass using various organic silicon compounds as starting materials, are described.

During the manufacturing of synthetic silica glass, for each example, oxygen gas $O_2$ (the combustion gas) and hydrogen gas $H_2$ (the combustible gas) are expelled from each nozzle of the burner 28 at a flow speed of 2.6 to 50 m/s. The flow amounts of the gases differ depending on the nozzles. The ratio of the flows for oxygen gas/hydrogen gas is 0.35 for the entire burner 28.

The gaseous silicon compound expelled from the burner 28 forms a soot. The soot is deposited on the synthesis surface of the ingot 36 formed of synthetic silica glass. During the synthesis of the silica glass, in order to have a uniform temperature on the synthesis surface of the ingot 36, the target 34 loaded with the ingot 36 is rotated and rocked at set intervals. In order to maintain a set distance between the synthesis surface of the ingot 36 and the edge of the burner 28, the target 34 is slowly lowered. Thus, an ingot of synthetic silica glass with a diameter of 240 mm and a length of 600 mm is obtained.

WORKING EXAMPLE 1

In the working example 1, tetramethoxysilane (TMOS), a type of alkoxysilane, was used. The boiling point of TMOS is 132° C. The amount of liquid TMOS supplied from the liquid material cylinder 10 to the vaporizer 12 was controlled with a liquid mass flow meter 20. In the working example 1, the amount of liquid TMOS supplied was controlled at a rate of 5 g/min. This is equivalent to, for example, the flow amount at 5 to 6 g/min. of silicon tetrachloride ($SiCl_4$).

In the vaporizer 12, the liquid TMOS introduced into the vaporizer 12 was heated to 150° C., which is 18° C. higher than its boiling point. Then, vaporized TMOS was supplied to the synthesis furnace 14.

When the ingot 36 manufactured in the working example 1 was observed by a naked eye, there were no bubbles observed in the ingot 36. The utilization rate of this ingot 36 manufactured according to the working example 1 was 65%. The higher the utilization rate, the better the vaporization of the material introduced into the synthesis furnace. The utilization rate is given as the proportion of the mass of the ingot 36 to the mass of the introduced material that is converted to $SiO_2$.

The amount of carbon (an impurity) in the ingot 36 manufactured according to the working example 1 was measured using a well-known method of combustion analysis. The carbon content (i.e., concentration of remaining carbon) was less than 10 ppm, which is below the limit of detection.

The ingot's transmittance of ultraviolet light at a wavelength of 193 nm was greater than 99.9%/cm. Therefore, the ingot 36 may be used to manufacture optical components for use in the ultraviolet region.

WORKING EXAMPLE 2

In the working example 2, hexamethyldisiloxane (HMDS), which is a type of alkylsiloxane, was used as the material. The boiling point of the HMDS is 99° C. The amount of liquid HMDS supplied from the liquid material cylinder 10 to the vaporizer 12 was controlled with a liquid mass flow meter 20. In the working example 2, the amount of liquid HMDS supplied was controlled at a rate of 5 g/min.

In the vaporizer 12, the liquid HMDS introduced into the vaporizer 12 was heated to 115° C., which is 16° C. higher than its boiling point. Then, vaporized HMDS was supplied to the synthesis furnace 14.

When the ingot 36 manufactured in the working example 2 was observed by a naked eye, there were no bubbles observed in the ingot 36. The utilization rate of this ingot 36 was 75%. The carbon content of the ingot 36 was less than 10 ppm, which is below the limit of detection. The ingot's transmittance of ultraviolet light at a wavelength of 193 nm was greater than 99.9%/cm. Therefore, the ingot 36 may be used to manufacture optical components for use in the ultraviolet region.

A disiloxane, such as hexamethyldisiloxane, contains 2 atoms of silicon (Si) per molecule. Therefore, it is appropriate as the material for synthetic silica glass.

WORKING EXAMPLE 3

Next, in the working example 3, methyltrimethoxysilane (MTMS), which is a type of alkoxysilane, was used as a starting material. The boiling point of MTMS is 103° C. The amount of liquid MTMS supplied from the liquid material cylinder 10 to the vaporizer 12 was controlled with a liquid mass flow meter 20. In the working example 3, the amount of liquid MTMS supplied was controlled at a rate of 5 g/min.

In the vaporizer 12, the liquid MTMS introduced into the vaporizer 12 was heated to 115° C., which is 12° C. higher than its boiling point. Then, the vaporized MTMS was supplied to the synthesis furnace 14.

When the ingot 36 manufactured in the working example 3 was observed by a naked eye, there were no bubbles observed in the ingot 36. The utilization rate of this ingot 36 was 70%. The carbon content of the ingot 36 was less than 10 ppm, which is below the limit of detection. The ingot's transmittance of ultraviolet light at a wavelength of 193 nm was greater than 99.9%/cm. Therefore, the ingot 36 may be used to manufacture optical components for use in the ultraviolet region.

WORKING EXAMPLE 4

2,4,6,8,-tetramethylcyclotetrasiloxane (TMCTS), which is a type of alkylcyclosiloxane, was used as the material in the working example 4. The boiling point of TMCTS is 135° C. The amount of liquid TMCTS supplied from the liquid material cylinder 10 to the vaporizer 12 was controlled with a liquid mass flow meter 20. In the working example 4, the amount of liquid TMCTS was controlled at a rate of 5 g/min.

In the vaporizer 12, the liquid TMCTS introduced into the vaporizer 12 was heated to 145° C., which is 10° C. higher than its boiling point. Then, vaporized TMCTS was supplied to the synthesis furnace 14.

When the ingot 36 manufactured in the working example 4 was observed by a naked eye, there were no bubbles observed in the ingot 36. The utilization rate of this ingot 36 was 65%. The carbon content of the ingot 36 was less than 10 ppm which is below the limit of detection. The ingot's transmittance of ultraviolet light at a wavelength of 193 nm was greater than 99.9%/cm. Therefore, the ingot 36 may be used to manufacture optical components for use in the ultraviolet region.

Next, comparative examples are described. In the comparative examples, which were conducted to verify the effect of the present invention, with the exception of the kinds of materials used and the heating temperature, the synthetic silica glass was manufactured using the equipment shown in FIG. 1.

COMPARATIVE EXAMPLE 1

In the comparative example 1, hexamethyldisiloxane (HMDS), which is a type of alkylsiloxane, was used. The boiling point of HMDS is 99° C. The amount of liquid HMDS supplied from the liquid material cylinder 10 to the vaporizer 12 was controlled with a liquid mass flow meter 20. In the comparative example 1, the amount of liquid HMDS was controlled at a rate of 5 g/min.

For the comparative example 1, in the vaporizer 12, the liquid HMDS introduced in the vaporizer 12 was heated to 100° C., which is approximately the same as its boiling point. Then, vaporized HMDS was supplied to the synthesis furnace 14.

When the ingot 36 manufactured in the working example 4 was observed by a naked eye, there were many bubbles observed in the ingot 36. The utilization rate of this ingot 36 was 5%. From the utilization rate, it is assumed that the gaseous silicon compound supplied to the synthesis furnace was re-liquidized in the gas material pipe 26 due to the low heating temperature.

The amount of carbon in the ingot 36 manufactured in the comparative example 1 was measured using a well-known method of combustion analysis. The carbon content was approximately 500 ppm.

The ingot's transmittance of ultraviolet light with a wavelength of 193 nm was measured. The transmittance was 98.5%/cm. It is assumed that the transmittance was low due to the high concentration of the remaining carbon impurities.

COMPARATIVE EXAMPLE 2

Next, in the comparative example 2, tetraethoxysilane (TEOS), which is a type of alkoxysilane, was used as the material. The boiling point of TEOS is 168° C. The amount of liquid TEOS supplied from the liquid material cylinder 10 to the vaporizer 12 was controlled with a liquid mass flow meter 20. In the comparative example 2, the amount of liquid TEOS was controlled at a rate of 5 g/min.

Then, in the vaporizer 12, the liquid TEOS introduced in the vaporizer 12 was heated to 180° C., which is 12° C. higher than its boiling point. Then, vaporized TEOS was supplied to the synthesis furnace 14.

When the ingot 36 manufactured in the comparative example 2 was observed by a naked eye, there were many bubbles observed in the ingot 36. The utilization rate of this ingot 36 was 5%. From the utilization rate, it is assumed that the gaseous silicon compound supplied to the synthesis furnace was re-liquidized in the gas material pipe 26 due to its high boiling point. The amount of carbon in the ingot 36 was measured using a well-known method of combustion analysis. The carbon content was approximately 1000 ppm.

The transmittance of ultraviolet light with a wavelength of 193 nm was measured for the ingot 36. The transmittance was 97.5%/cm. It is assumed that the transmittance was low due to the high concentration of the remaining carbon impurities.

Table 1 shows the measurement results of the above-mentioned Working examples 1 to 4 and Comparative Examples 1 and 2.

TABLE 1

| | material | flow amount of material (g/min.) | vaporization temperature (° C.) | bubbles | scavenger rate (%) | carbon content (ppm) | 193 nm transmittance (%/cm) |
|---|---|---|---|---|---|---|---|
| working example 1 | TMOS | 5.0 | 150 | none | 65 | <10 | >99.9 |
| working example 2 | HMDS | 5.0 | 115 | none | 75 | <10 | >99.9 |
| working example 3 | MTMS | 5.0 | 115 | none | 70 | <10 | >99.9 |
| working example 4 | TMCTS | 5.0 | 145 | none | 65 | <10 | >99.9 |
| comparative example 1 | HMDS | 5.0 | 100 | many | 5 | 500 | 98.5 |
| comparative example 2 | TEOS | 5.0 | 180 | many | 5 | 1000 | 97.5 |

In order to maintain the pressure of the liquid silicon compound 32 from the liquid material cylinder 10 to the interior of the synthesis furnace 14, a pressure is applied to the liquid silicon compound 32 by a pressurizing gas, such as a helium gas. Therefore, the pressuring gas will dissolve into the liquid silicon compound 32. The dissolved gas can sometimes generate bubbles in the liquid silicon compound 32 due to a reduction in the solubility of the gas caused by changes in pressure in the pipe 18. When the bubbles are generated in the liquid silicon compound 32, they hinder the control of the flow rate of the liquid silicon compound 32 by the liquid mass flow meter 20.

When the control of the flow rate of the liquid silicon compound 32 is poor, the temperature of the vaporized liquid silicon compound 32 and the amount introduced into the synthesis furnace 14 become unstable. As a result, the synthesizing conditions of the synthetic silica glass in the synthesis furnace 14 becomes unstable. Consequently, the resulting synthetic silica glass is non-uniform, and its quality is poor.

As a result of various research, the present inventors concluded that if a liquid material is introduced into the liquid mass flow meter 20 after the bubbles inside the liquid are removed, the accuracy of the flow control of the material solution improves, and the liquid silicon compound 32 can be stably supplied to the vaporizer 12.

However, through various experiments it was found that merely removing the bubbles already generated in the liquid silicon compound 32 is not sufficient to improve the accuracy of the flow control. Therefore, as a result of further research, the inventors discovered that when the bubbles are removed after additional gas bubbles are forcibly generated, the flow of liquid silicon compound 32 can then be stabilized. Flow control of the liquid silicon compound 32 from which the bubbles have been removed through a foaming and degassing process is done using a liquid mass flow meter 20. Consequently, the liquid silicon compound 32 can be stably supplied to the vaporizer 12.

It is also desirable to include a flow control process wherein the amount of flow of the liquid silicon compound 32 from which the bubbles are removed is controlled by a liquid mass flow meter 20, after the foaming process. As a result, the accuracy of the flow control can be improved. It is also desirable to reduce the pressure of the liquid silicon compound 32 during the foaming process.

In the liquid silicon compound 32 introduced into the liquid mass flow meter 20, pressure is exerted by a pressurizing gas in order to maintain the pressure of the liquid silicon compound 32 from the liquid material cylinder 10 to the interior of the synthesis furnace 14. Therefore, when the pressure of the liquid silicon compound 32 is reduced, it is possible to generate bubbles from the gas dissolved in the liquid silicon compound 32.

When reducing the pressure of the liquid silicon compound 32, it is preferable to have a check-valve in the middle of the pipe 18, and to have the liquid silicon compound 32 flow through the check-valve. Having a check-valve in the middle of the pipe 18 narrows the flow path of the pipe 18 due to the check-valve. As a result, the pressure of the liquid silicon compound 32 drops. The pressure of the liquid silicon compound 32 after it passes through the check-valve is therefore less than the pressure before it passes through the check valve. Consequently, it is possible to reduce the solubility of the gas in the liquid silicon compound 32, and to generate bubbles from the gas dissolved in the liquid silicon compound 32.

In order to reduce the pressure of the liquid silicon compound 32, it is preferable to have a porous filter in the middle of the pipe 18, and to have the liquid silicon compound 32 flow through the porous filter. Having the porous filter in the middle of the pipe 18 narrows the flow path in the pipe 18. As a result, the pressure of the liquid silicon compound 32 drops, and the pressure of the liquid silicon compound 32 after it passes through the check-valve is less than the pressure before it passes through the check valve. Consequently it is possible to reduce the solubility of the gas in the liquid silicon compound 32, and to generate bubbles from the gas dissolved in the liquid silicon compound 32.

It is also preferable to heat the liquid silicon compound 32 during the foaming process. When the liquid silicon compound 32 is heated, the solubility of the gas in the liquid silicon compound 32 is reduced, and it is possible to generate bubbles from the gas, which is dissolved in the liquid silicon compound 32. However, the heating temperature of the liquid silicon compound 32 should be lower than the maximum heat resistance temperature of the liquid mass flow meter 20 when the liquid silicon compound 32 is heated.

It is preferable to remove the bubbles from the material solution by using a semi-permeable membrane that allows the bubbles to permeate out, while the silicon compounds are not allowed to permeate out. When such a semi-permeable membrane is used, it is possible to remove the bubbles from the liquid silicon compound 32.

In addition, it is preferable to have the higher pressure on the liquid silicon compound 32 side (inside) of the semi-permeable membrane than on the opposite side (outside) of the semi-permeable membrane. When the difference in the pressure is such that the pressure on the outside of the semi-permeable membrane is negative relative to the inside pressure, the bubbles generated, which are similar to bubbles in carbonated water, can be effectively removed from the liquid silicon compound 32.

It is also preferable to aspirate the outside of the semi-permeable membrane with a vacuum pump. When the vacuum pump is used, the outside of the semi-permeable membrane can easily be set to a negative pressure.

It is also preferable to use a porous tube as a semi-permeable membrane and then place the liquid mass flow meter 20 inside the porous tube. By using a longer porous tube, it is possible to increase the area of the semi-permeable membrane. As a result, it is possible to effectively remove the bubbles.

Figure 2:
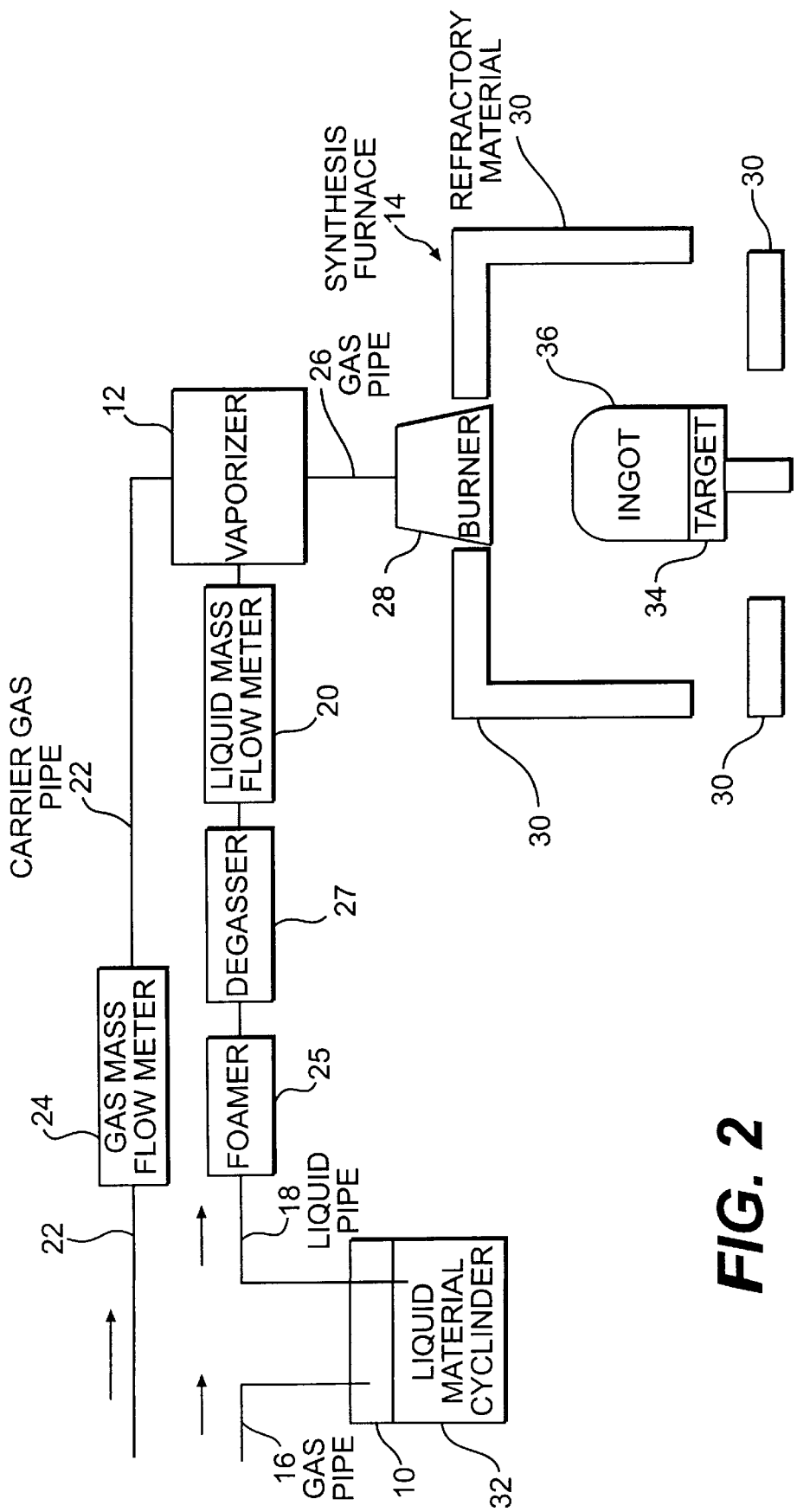
FIG. 2 is a block diagram illustrating a foamer and a degasser in the apparatus used in the manufacturing method of the synthetic silica glass of the present invention.
Figure 3:
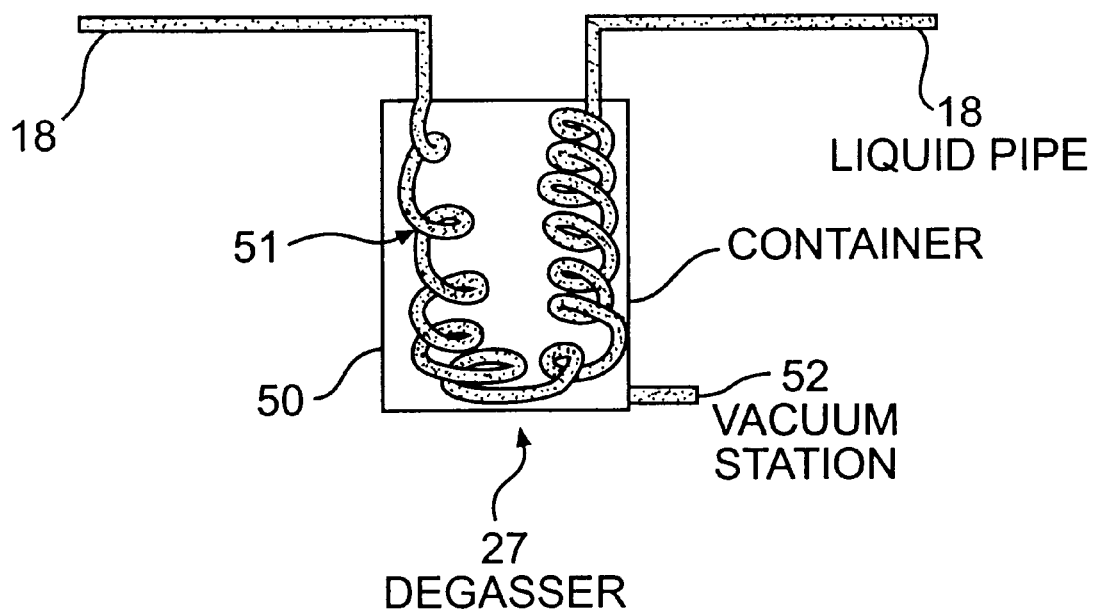
FIG. 3 shows the degasser.

As shown in FIG. 2, in the pipe 18, a foaming device (foamer) 25, a degassing device (degasser) 27 and a liquid mass flow meter 20 are arranged sequentially in the pipe 18.

It is preferable to place the check-valve, the porous filter, or a heating device in the foaming device 25. Such porous filters are manufactured by the Millipore Corp. of Bedford, Mass., with pore diameter of 0.2 $\mu$m. In addition, the heater can be a rubber heater or a high-frequency inductive coil wrapped around the pipe 18. The foamer 25 can have a combination of two or more check-valves, porous filters or heaters.

The degasser 27 includes a porous Teflon tube 51. The internal diameter of the Teflon tube is approximately 1 mm, and its thickness is approximately 0.5 mm. The Teflon tube is placed in a vacuum chamber 50 evacuated by a vacuum pump (52).

When the pressurizing gas is sent into the liquid material cylinder 10, the liquid silicon compound 32 is expelled from the liquid material cylinder 10. The liquid silicon compound 32 is supplied to the vaporizer 14 by passing through the foamer 25, the degasser 27 and the liquid mass flow meter 20.

The liquid silicon compound 32 expelled from the material cylinder 12 is first introduced into the foamer 25. In the foamer 25, the solubility of the gas the liquid silicon compound 32 10 is reduced, and bubbles of the gas dissolved in the liquid silicon compound 32 are generated (i.e., a foaming process occurs).

As discussed above, in order to reduce the solubility of gas, the pressure of the liquid silicon compound 32 can be reduced, and the liquid silicon compound 32 may be heated prior to the liquid mass flow meter 20.

In order to heat the liquid silicon compound 32 it is preferable to attach the foamer 25 to the liquid mass flow meter 20 by a rubber heater or a high-frequency inductive coil wrapped around the pipe 18. As described above, when the temperature of the liquid silicon compound 32 is increased by heating it, the solubility of the gas dissolved in the liquid silicon compound 32 is reduced, and bubbles are generated from the gas dissolved in the liquid silicon compound 32. However, it is desirable for the heating temperature of the liquid solution to be lower than the maximum heat resistance of the liquid mass flow meter 20 (for example approximately 80° C.).

Next, the liquid silicon compound 32 that passed through the foamer 25 is introduced into degasser 27. In the degasser 27, bubbles generated in the liquid silicon compound 32 are removed (i.e., a degassing process occurs).

To remove the bubbles, the liquid silicon compound 32 passes through a porous Teflon tube arranged in a vacuum chamber. The inside of the vacuum chamber is aspirated with a vacuum pump (for example, a rotary pump) and a difference in pressure of approximately 3 kg/cm$^2$ is generated between the inside and the outside of the Teflon tube. As a result, the pressure outside the Teflon tube is lower than the pressure inside. The porous Teflon tube functions as a semi-permeable membrane in which the gas permeates out, and the silicon compounds do not. Therefore, the bubbles can be effectively removed from the liquid silicon compound 32 that passes through the Teflon tube.

The liquid silicon compound 32 that passes through the degasser 27 is introduced in the liquid mass flow meter 20. The liquid mass flow meter 20 is used to control the flow of the liquid silicon compound 32. Bubbles are removed from the liquid silicon compound 32 via the foaming and degassing processes. Therefore, the accuracy of the flow control at the liquid mass flow meter 20 can be improved. The temperature of the liquid silicon compound 32 is approximately room temperature, which is lower than its boiling point. Therefore, the flow rate can be sufficiently controlled using a conventional liquid mass flow meter.

The remainder of the process is the same as that described with reference to FIG. 1.

Table 2 below shows the measurement results for Working examples 5 to 8 and Comparative Examples 3 and 4.

TABLE 2

|  | material | flow amount of material (g/min.) | vaporization temperature (° C.) | bubbles | bubble carbon content (ppm) | 193 nm transmittance (%/cm) |
| --- | --- | --- | --- | --- | --- | --- |
| working example 5 | TMOS | 5.0 | 150 | none | <10 | >99.9 |
| working example 6 | HMDS | 5.0 | 115 | none | <10 | >99.9 |
| working example 7 | MTMS | 5.0 | 115 | none | <10 | >99.9 |
| working example 8 | TMCTS | 5.0 | 145 | none | <10 | >99.9 |
| comparative example 3 | HMDS | 5.0 | 100 | many | 50 | 98.5 |
| comparative example 4 | TEOS | 5.0 | 180 | many | 100 | 97.5 |

WORKING EXAMPLE 5

In Working example 5, tetramethoxysilane (TMOS), which is a type of alkoxysilane, was used. The boiling point of TMOS is 132° C. The amount of TMOS supplied from the material cylinder 10 to the vaporizer 12 was controlled by a liquid mass flow meter 20. The flow rate of the liquid silicon compound 32 was 5 g/min. This is equivalent to approximately 12 to 13 g/min. of silicon tetrachloride ($SiCl_4$).

The liquid silicon compound 32 introduced into the vaporizer 14 was heated to 150° C., which is 18° C. higher than the boiling point of the liquid silicon compound 32. Then, the vapor was supplied to the synthesis furnace 14.

When the manufactured ingot in Working example 1 was observed by a naked eye, there were no bubbles visible.

The amount of carbon in the manufactured ingot of Working example 5 was measured using a combustion analysis method. The amount of carbon (remaining carbon concentration) was less than 10 ppm, which is lower than the detectable limit.

The transmittance at 193 nm was 99.9%. Therefore, the optical member obtained from this ingot is an appropriate material for ultraviolet applications.

WORKING EXAMPLE 6

In Working example 6, hexamethyldisiloxane (HMDS), which is a type of alkylcyclosiloxane, was used as the starting material. The boiling point of HMDS is 99° C. The amount of HMDS supplied as the liquid silicon compound 32 from the material cylinder 10 to the vaporizer 12 was controlled by the liquid mass flow meter 20. In Working example 6, the flow rate of the liquid silicon compound 32 was 5 g/min.

The liquid silicon compound 32 introduced into the vaporizer 12 was heated to 115° C., which is 16° C. higher than the boiling point of HMDS. Then, the vapor was supplied to the synthesizing furnace 14.

When the manufactured ingot in Working example 6 was observed by a naked eye, there were no bubbles visible. The remaining carbon concentration was less than 10 ppm, which is lower than the detectable limit. The transmittance at 193 nm was 99.9%. Therefore, the optical member obtained from this ingot is an appropriate material for ultraviolet applications.

Disiloxane, such as hexamethyldisiloxane, has two silicon (Si) atoms per molecule, and is a good material for manufacturing synthetic silica glass.

WORKING EXAMPLE 7

Next, in Working example 7, methyltrimethoxysilane (MTMS), which is a type of alkoxysilane, was used. The boiling point of MTMS is 103° C. The amount of MTMS supplied from the material cylinder 10 to the vaporizer 12 was controlled by the liquid mass flow meter 20. In Working example 7, the flow rate of the liquid silicon compound 32 was 5 g/min.

The liquid silicon compound 32 introduced into the vaporizer 12 was heated to 115° C., which is 12° C. higher than the boiling point of the liquid silicon compound 32. Then, the MTMS vapor was supplied to the synthesis furnace 14.

When the manufactured ingot in Working example 7 was observed by a naked eye, there were no bubbles visible. The remaining carbon concentration was less than 10 ppm, which is lower than the detectable limit. The transmittance at 193 nm was greater than 99.9%. Therefore, the optical member obtained from this ingot is an appropriate material for ultraviolet applications.

WORKING EXAMPLE 8

In Working example 8, 2,4,6,8-tetramethylcyclotetrasiloxane (TMCTS), which is a type of alkylcyclosiloxane, was used. The boiling point of TMCTS is 135° C. The amount of TMCTS supplied from the material cylinder 10 to the vaporizer 12 was controlled by the liquid mass flow meter 20. In Working example 8, the flow rate of the liquid silicon compound 32 was 5 g/min.

The liquid silicon compound 32 introduced into vaporizer 14 was heated to 145° C., which is 10° C. higher than the boiling point of the TMCTS. Then, the TMCTS vapor was supplied to the synthesis furnace 14.

When the manufactured ingot in Working example 8 was observed by a naked eye, there were no bubbles visible. The remaining carbon concentration was less than 10 ppm, which is lower than the detectable limit. The transmittance at 193 nm was greater than 99.9%. Therefore, the optical member obtained from this ingot is an appropriate material for ultraviolet applications.

Next, comparative examples are described. In the comparative examples, synthetic silica glass was manufactured under conditions that are identical to the above-mentioned embodiments except for the type of material, the heating temperature and the foaming process.

COMPARATIVE EXAMPLE 3

In Comparative Example 3, hexamethyldisiloxane (HMDS) was used. However, in Comparative Example 1, the foaming process was not done, and the liquid silicon compound 32, which only went through the degassing process, was introduced into the liquid mass flow meter 20. The HMDS that went through only the degassing process therefore had a small amount of bubbles remaining.

The liquid HMDS introduced into the vaporizer 12 was heated to 100° C., which was approximately the same as the boiling point of HMDS. Then, the HMDS vapor was supplied to the synthesis furnace 14.

The ingot manufactured in Comparative Example 3 was observed by a naked eye. There were many bubbles visible in the ingot. The remaining carbon concentration of the ingot manufactured in Comparative Example 3 was approximately 50 ppm. The transmittance of the ingot at 193 nm was 98.5%.

In Comparative Example 3, the reason for the reduction in the quality of the obtained synthetic silica glass is likely due to the fact that the removal of the gas from the liquid silicon compound 32 with only the degassing process is insufficient. Therefore, the accuracy of the flow control by the liquid mass flow meter 20 was reduced. The amount of heat supplied for vaporization of the liquid silicon compound 32 in the vaporizer 12 is constant. Therefore, when the flow amount of the liquid silicon compound 32 varies, the temperature of the vapor obtained by vaporizing the liquid silicon compound 32 in the vaporizer 12 also varies. In addition, when there is a gas component contained in the liquid silicon compound 32, the heat of the vaporizer is absorbed by the gas component, and the amount of heat supplied to the liquid silicon compound 32 is reduced. Consequently, in Comparative Example 3, HMDS was insufficiently vaporized inside the vaporizer 12, but was supplied to synthesis furnace 14 anyway. Therefore, it is likely that there were many bubbles in the obtained ingot, and the remaining carbon concentration was higher. As a result of the higher remaining carbon concentration, the transmittance of the ingot was reduced.

COMPARATIVE EXAMPLE 4

Next, in Comparative Example 4, tetraethoxysilane (TEOS) was used. The boiling point of TEOS is 168° C. However, in Comparative Example 4, the foaming process was not done and the liquid TEOS, which went through only the degassing process, was introduced to the liquid mass flow meter 20. The liquid TEOS that went through the degassing process had a small amount of bubbles remaining.

The liquid TEOS introduced into the vaporizer 12 was heated to 180° C., which is 12° C. higher than the boiling point of the material. Then, the TEOS vapor was supplied to the synthesis furnace 14.

The ingot manufactured in Comparative Example 4 was observed by a naked eye. There were many bubbles visible in the ingot. The remaining carbon concentration of the ingot was approximately 100 ppm. The transmittance of the ingot at 193 nm was 97.5%.

As described above, in Comparative Example 4, as in Comparative Example 3, the reason for the reduction in the quality of the obtained synthetic silica glass is likely due to the fact that removal of the gas inside the liquid mass flow meter 20 with only the degassing process is insufficient. Therefore, the accuracy of the flow control by the liquid mass flow meter 20 was reduced. As a result of variations in the flow, the vaporization of the liquid silicon compound 32 became insufficient. In particular, the liquid silicon compound 32 of Comparative Example 4 (TEOS) has a high boiling point of 168° C., and it is possible that the vapor partially re-liquefied. Therefore, it is assumed that there were many bubbles in the obtained ingot and the remaining carbon concentration was higher. As a result of the high remaining carbon concentration, the UV transmittance of the ingot was reduced.

During the degassing process, a tube-shaped semi-permeable membrane was used, however, the form of the semi-permeable membrane is not limited to a tubular shape. For example, a sheet-shaped semi-permeable membrane may also be used.

With the manufacturing method of the synthetic silica glass of the present invention, it is possible to stably supply the liquid silicon compound 32 after the bubbles are removed, by subjecting it to a foaming and degassing process. In addition, by controlling the flow rate with the liquid mass flow meter 20, once the bubbles are removed, it is possible to improve the accuracy of the flow control of the liquid mass flow meter 20 by the liquid mass flow meter.

Although only specific materials and conditions were described, the present invention can be used with many changes and in many forms. For example, in the above examples, the liquid silicon compound was mixed with a carrier gas after it was placed in a mist state; however, it is possible to mix the liquid silicon compound with the carrier gas before the liquid silicon compound reaches a mist state.

Thus, in the present invention, by controlling the amount of the liquid silicon compound introduced into the vaporizer using a liquid mass flow meter, it is possible to indirectly control the amount of the gaseous silicon compound introduced into the synthesis furnace.

While the invention has been described in detail and with reference to specific embodiments thereof, it will be apparent to those skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A manufacturing method for synthetic silica glass comprising the steps of:

generating bubbles in a liquid silicon compound using a foamer;

removing the bubbles using a degasser;

introducing the liquid silicon compound into a vaporizer;

vaporizing the liquid silicon compound to produce a vapor; and introducing the vapor into a synthesis furnace to form synthetic silica glass, wherein a flow rate of the liquid silicon compound is controlled using a liquid mass flow meter.

2. The method of claim 1, wherein the steps of generating bubbles and removing the bubbles occur prior to introducing the liquid silicon compound into the liquid mass flow meter.

3. The method of claim 1, wherein the step of generating bubbles reduces a pressure of the liquid silicon compound.

4. The method of claim 1, wherein the step of generating bubbles includes the step of heating the liquid silicon compound.

5. The method of claim 1, wherein the step of removing the bubbles uses a semi-permeable membrane.

6. The method of claim 5, wherein the semi-permeable membrane allows the bubbles to permeate out while the liquid silicon compound does not permeate out.

7. The method of claim 5, wherein a pressure on a liquid silicon compound side of the semi-permeable membrane is higher than a pressure on an opposite side of the semi-permeable membrane.

8. The method of claim 1, wherein the liquid silicon compound is an organic compound.

9. A method of manufacturing synthetic silica glass comprising the steps of:

generating bubbles in a liquid silicon compound using a foamer;

removing the bubbles using a degasser;

introducing the liquid silicon compound into a vaporizer, wherein an amount of the liquid silicon compound is controlled with a liquid mass flow meter;

converting the liquid silicon compound into a gaseous silicon compound; and supplying the gaseous silicon compound into a synthesis furnace to form synthetic silica glass.

10. A method of manufacturing synthetic silica glass comprising the steps of:

pressurizing a liquid storage tank including a liquid silicon compound therein;

generating bubbles in the liquid silicon compound using a foamer;

removing the bubbles using a degasser;

displacing the liquid silicon compound into a vaporizer while controlling an amount of the liquid silicon compound displaced by a liquid mass flow meter;

mixing the displaced liquid silicon compound with a carrier gas to generate a gaseous silicon compound;

injecting the gaseous silicon compound into a synthesis furnace; and forming synthetic silica glass by hydrolyzing the gaseous silicon compound in the synthesis furnace.

\* \* \* \* \*